(12) United States Patent
Besserer et al.

(10) Patent No.: US 6,190,081 B1
(45) Date of Patent: Feb. 20, 2001

(54) FASTENING DEVICE

(75) Inventors: Horst Besserer, Herborn; Marc Hartel, Reiskirchen; Walter Nicolai, Busek, all of (DE)

(73) Assignee: Rittal-Werk Rudolf Loh GmbH & Co., Herborn (DE)

(*) Notice: Under 35 U.S.C. 154(b), the term of this patent shall be extended for 0 days.

(21) Appl. No.: 09/190,685

(22) Filed: Nov. 12, 1998

(30) Foreign Application Priority Data

Nov. 14, 1997 (DE) .............................. 197 50 427

(51) Int. Cl.⁷ ...................................... F16B 9/02
(52) U.S. Cl. ................... 403/231; 312/265.1; 211/26; 211/183
(58) Field of Search ................... 403/230, 231, 403/240, 252, 256; 312/265.1, 265.2, 265.3, 265.4, 265.5, 265.6; 211/183, 190, 26; 243/243; 361/829

(56) References Cited

U.S. PATENT DOCUMENTS

| | | | |
|---|---|---|---|
| 4,014,618 | * | 3/1977 | Kristiansen ................ 403/231 X |
| 4,158,998 | * | 6/1979 | Clement ................... 248/243 X |
| 5,312,078 | * | 5/1994 | Marsh ..................... 403/231 X |
| 5,655,821 | * | 8/1997 | Laboch et al. ............. 312/265.4 X |
| 5,749,476 | * | 5/1998 | Besserer et al. ........... 211/26 |
| 5,930,972 | * | 8/1999 | Benner et al. ............. 211/26 X |
| 5,992,646 | * | 11/1999 | Benner et al. ............. 211/26 |
| 6,012,791 | * | 1/2000 | Benner et al. ............. 312/265.2 |

FOREIGN PATENT DOCUMENTS

| | | |
|---|---|---|
| 87 03 311 U | 6/1987 | (DE). |
| 89 10 783 U | 1/1990 | (DE). |
| 195 37 016 | 10/1996 | (DE). |

* cited by examiner

Primary Examiner—Harry C. Kim
(74) Attorney, Agent, or Firm—Pauley Petersen Kinne & Fejer

(57) ABSTRACT

A fastening device for attachment of, for example, mounting rails to vertical frame profiles of a switchgear cabinet. The frame profiles have rows of evenly distributed fastening retainers. A fastening block, which has fastening retainers for connecting the mounting rail or the like, can be added to the frame profile. In order to secure fastening of the mounting rail on the vertical frame profile, which only requires a small outlay of parts, the fastening block is manufactured either as a punched and bent element from a sheet metal blank or as an extruded element. At least one hook element projects from the fastening block, which can be suspended in an associated fastening retainer of the frame profile. The fastening block has two lateral walls, which extend at right angles with respect to each other and form a common vertical inner edge facing the interior of the switchgear cabinet. The lateral walls are equipped with the fastening retainers for connecting the add-on elements.

8 Claims, 3 Drawing Sheets

FASTENING DEVICE

BACKGROUND OF THE INVENTION

1. Field of the Invention

This invention relates to a fastening device for attachment of add-on elements, such as mounting rails, storage plates or the like, to vertical frame profiles of a switchgear cabinet, which have rows of evenly distributed fastening retainers, wherein a fastening block, which has fastening retainers for connecting the add-on element, can be added to the frame profile.

2. Description of Prior Art

Such a fastening device is known from German Patent Reference DE 195 37 016 C1. A rack for a switchgear cabinet is described in this publication, wherein the frame profiles are embodied mirror-reversed in relation to their cross-sectional diagonal line and have two receiving sections with fastening retainers in the area of the inside of the rack. These receiving sections are oriented parallel with respect to the associated outsides of the rack and form an interior retainer. A dove-tailed groove, open toward the cross-sectional diagonal line, adjoins this interior retainer. A fastening block, having a dove-tailed strip, can be inserted into the groove and can be fixed in place therein by rotating the fastening block 90°. Here, the fastening block is supported in the dove-tailed groove by a dove-tailed strip. The free surfaces of the fastening block have threaded bores and mounting rails can be fastened therein.

SUMMARY OF THE INVENTION

It is one object of this invention to create a fastening device which allows simple and secure fixing in place of the fastening block, and wherein the fastening block can be produced with a small cost for parts.

This object is attained with a fastening block manufactured as a punched and bent element from a sheet metal blank or as an extruded element. At least one hook element projects from the fastening block, which can be suspended in an associated fastening retainer of the frame profile. The fastening block has two lateral walls, which extend at right angles with respect to each other and form a common vertical inner edge facing the interior of the switchgear cabinet. The lateral walls have the fastening retainers for connecting the add-on elements.

The attachment of the fastening block to a vertical frame profile is easily made possible with the hook elements. In particular, the hook elements can be positioned on the frame profile in a mounting position, which is prescribed by the fastening grid of the fastening receivers. Mounting rails can be installed on the lateral walls. It is possible to absorb large forces by means of the interlocking connection of the fastening block with the vertical frame profile, so that correspondingly large loads can be exerted on the mounting rails. In accordance with this invention, the fastening block is made as a punched and bent element from a sheet metal blank or as an extruded element and is manufactured as a part. In this way the fastening block can be produced in a cost-effective manner.

It is provided in accordance with a preferred embodiment of this invention that the lateral walls are maintained on the same level in which profiled sides of the vertical frame profiles, which extend vertically with respect to the sides of the switchgear cabinet with which they are associated, are also arranged. Thus the profiled sides and the lateral walls form a common fastening level.

A possible variation of this invention is distinguished because the fastening block is maintained in an interior receiver of the vertical frame profile, which is formed by two interior walls extending at an angle with respect to each other and extending in a longitudinal direction of the frame profile. The interior walls have fastening receivers, and the fastening block is fixed in place in one of the fastening receivers by at least one hook element. Thus the fastening block is aligned on the interior walls by means of centering surfaces, so that an exact positioning is possible.

In one preferred embodiment of this invention, adjoining one of the two lateral walls the fastening block has a flange supporting at least one hook element. The flange has a screw receiver, into which a screw is introduced and is screwed into a fastening receiver of the frame profile. Initially, the fastening block can be positioned and maintained on the frame profile with its hook elements. The fastening block can be captively fixed on the frame profile with the screw. This is of particular importance when a switchgear cabinet equipped with built-ins is transported or otherwise subjected to vibrations. The screw assures that the fastening block is always securely fixed in place on the frame profile with its hook elements.

If horizontal support surfaces are bent away from the lateral walls, which seal the fastening block on the top and bottom, and the support surfaces have fastening receivers, the fastening block can be used for the attachment of horizontal storage surfaces which can be placed on the support surfaces and can be fixed in place on the fastening receivers with fastening screws.

This invention will be explained in greater detail in what follows by means of an exemplary embodiment represented in the drawings.

DESCRIPTION OF PREFERRED EMBODIMENTS

Figure 1:
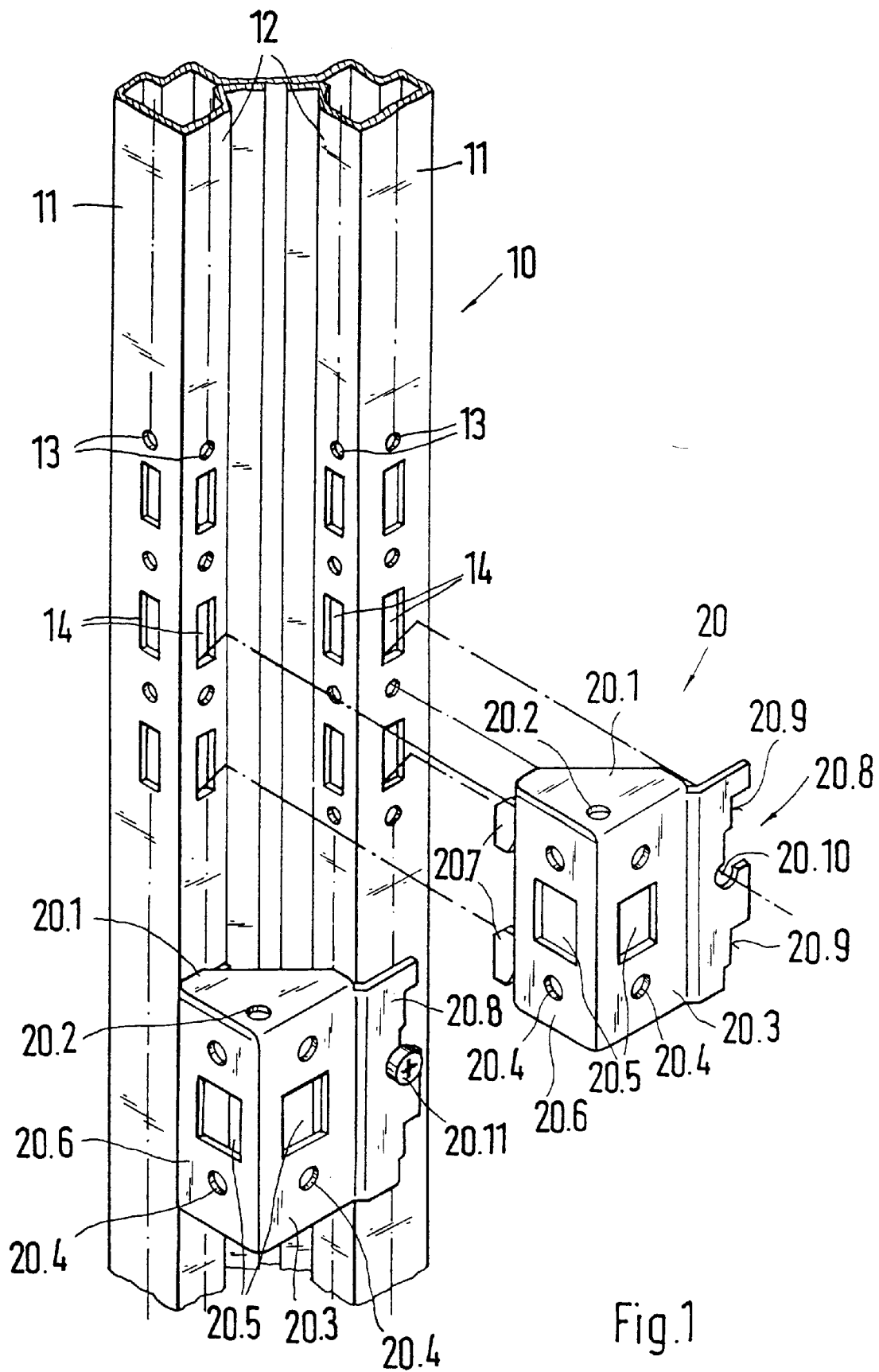
FIG. 1 is a perspective view of a vertical frame profile of a rack and two fastening blocks.

FIG. 1 represents a vertical frame profile 10 of a switchgear cabinet. The vertical frame profile 10 has two profiled sides 11, which extend vertically with respect to the associated lateral walls of a rack. The profiled sides 11 make a right-angled transition into interior walls 12. In turn, the interior walls 12 extend at right angles to each other and form an interior receiver extending in a longitudinal direction of the frame profile 10. Both the interior walls 12 and the profiled side 11 have rows of fastening retainers 13, 14, which are arranged at even distances from each other. In this embodiment, the fastening retainers 13 are designed as circular holes, and the fastening retainers 14 are designed as slit-shaped openings. Fastening blocks 20 can be fixed in place in the vertically extending interior receiver of the frame profile 10. The fastening blocks 20 are made in the form of punched and bent elements from a sheet metal blank.

The fastening blocks 20 have two lateral walls 20.3, 20.6, which are at right angles to each other. The two lateral walls 20.3, 20.6 form a common vertical interior edge facing the interior of the switchgear cabinet. Each of the two lateral walls 20.3, 20.6 respectively has two circular fastening receivers 20.4 and a square opening 20.5. Here, the distance between the two circular fastening receivers 20.4 corresponds to the distance between the fastening receivers 13 cut into the profiled sides 11, or respectively the interior walls 12. The center distance of the fastening receiver 20.4 to the opening 20.5 corresponds to one-half of the division grid at which the fastening receivers 14 of the profiled sides 11, or respectively of the interior walls 12, are spaced apart from each other. A flange 20.8 adjoins the lateral wall 20.3 via a transition section. Hook elements 20.9 are punched out of the flange 20.8 and bent at right angles. The hook elements 20.9 extend parallel with the lateral wall 20.6.

A screw receiver 20.10 is cut into the flange 20.8. A support surface 20.1 is bent away from the upper horizontal end of the lateral wall 20.3. The support surface 20.1 is horizontally positioned. In its corner area facing the two lateral walls 20.3, 20.6, the support surface 20.1 has a receiving retainer 20.2.

The second lateral wall 20.6 is angled in the direction toward the flange 20.8. The angled portion extends parallel with the lateral wall 20.3. Two hook elements 20.7 are punched out of the angled portion and are bent in such a way that they extend parallel with the associated lateral wall 20.6.

The fastening block 20 can be fixed in place on the vertical frame profile 10. The hook elements 20.7, 20.9, which have insertion slopes, are suspended in the fastening receivers 14 of the frame profiles 10. In the process, the hook elements 20.7 engage the fastening receivers 14 of the associated interior wall 12, the hook elements 20.9 extend behind the fastening receivers 14 of the associated profiled side 11. As shown in FIG. 1, the fastening block 20 is placed against the fastening receivers 14 and is pushed vertically downward, so that the hook elements 20.7, 20.9 are clamped on the fastening receivers 14. To assure that the fastening block 20 can no longer fall off the frame profile 10, for example because of vibrations or in the course of transporting the switchgear cabinet, a screw connection between the fastening block 20 and the frame profile 10 is provided. Thus, a screw 20.11 is inserted into the screw receiver 20.10 and screwed into the respective fastening receiver 13. Here, the screw 20.11 is embodied as a tapping screw, having a screw thread that cuts into the fastening receiver 13.

Figure 2:
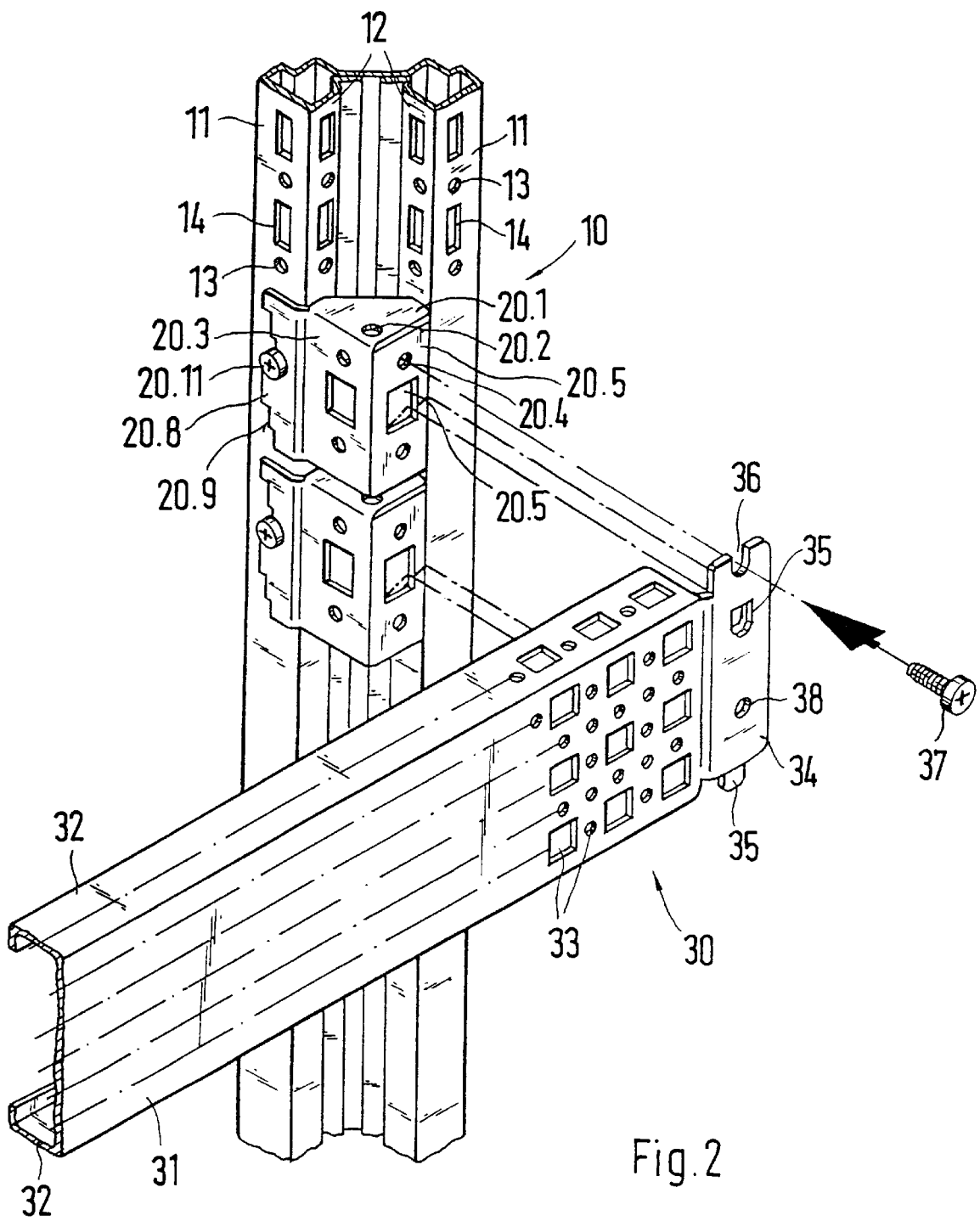
FIG. 2 is a perspective view of a vertical frame profile with two fastening blocks attached thereto, as well as a mounting rail.

A possible variation of the fastening block 20 in accordance with this invention is shown in FIG. 2. Two fastening blocks 20 are fixed in place, one above the other, in the vertical interior receiver of the vertical frame profile 10. A mounting rail 30 can be fastened on the fastening blocks 20. The mounting rail 30 is formed box-like by a front wall 31 and two lateral walls 32 bent at right angles. The front wall 31 and the lateral walls 32 each respectively has rows of fastening receivers 30, evenly spaced apart from each other. Lateral elements 34 are connected to the longitudinal ends of the mounting rail 30. Since the mounting rail 30 is only partially shown in FIG. 2, only one lateral element 34 is visible. Two hooks 35 are punched out of the lateral element 34 and are are bent in the direction toward the free ends of the lateral walls 32. The lateral element 34 also has two screw receivers 36.

The mounting rail 30 equipped in this way can be suspended with its hooks 35 in the fastening receiver 20.4 of the fastening block 20. In order to maintain the mounting rail 30 captively on the fastening blocks 20, the mounting rail 30 can be additionally screwed to the fastening blocks 20. A fastening screw 37 is inserted into one of the screw receivers 36, 38 and is screwed into the associated fastening receiver 20.4 of one of the two fastening blocks 20. The fastening screw 37 is embodied as a tapping screw, having a screw thread that automatically cuts into the fastening receiver 20.4. As shown in FIG. 2, the lateral element 34 is maintained by means of a transition section projecting past the mounting level of the front wall 31. This projection is selected in such a way that the front wall 31 is arranged at the same level in which the lateral walls 20.6 and the profiled side 11 are also located.

Figure 3:
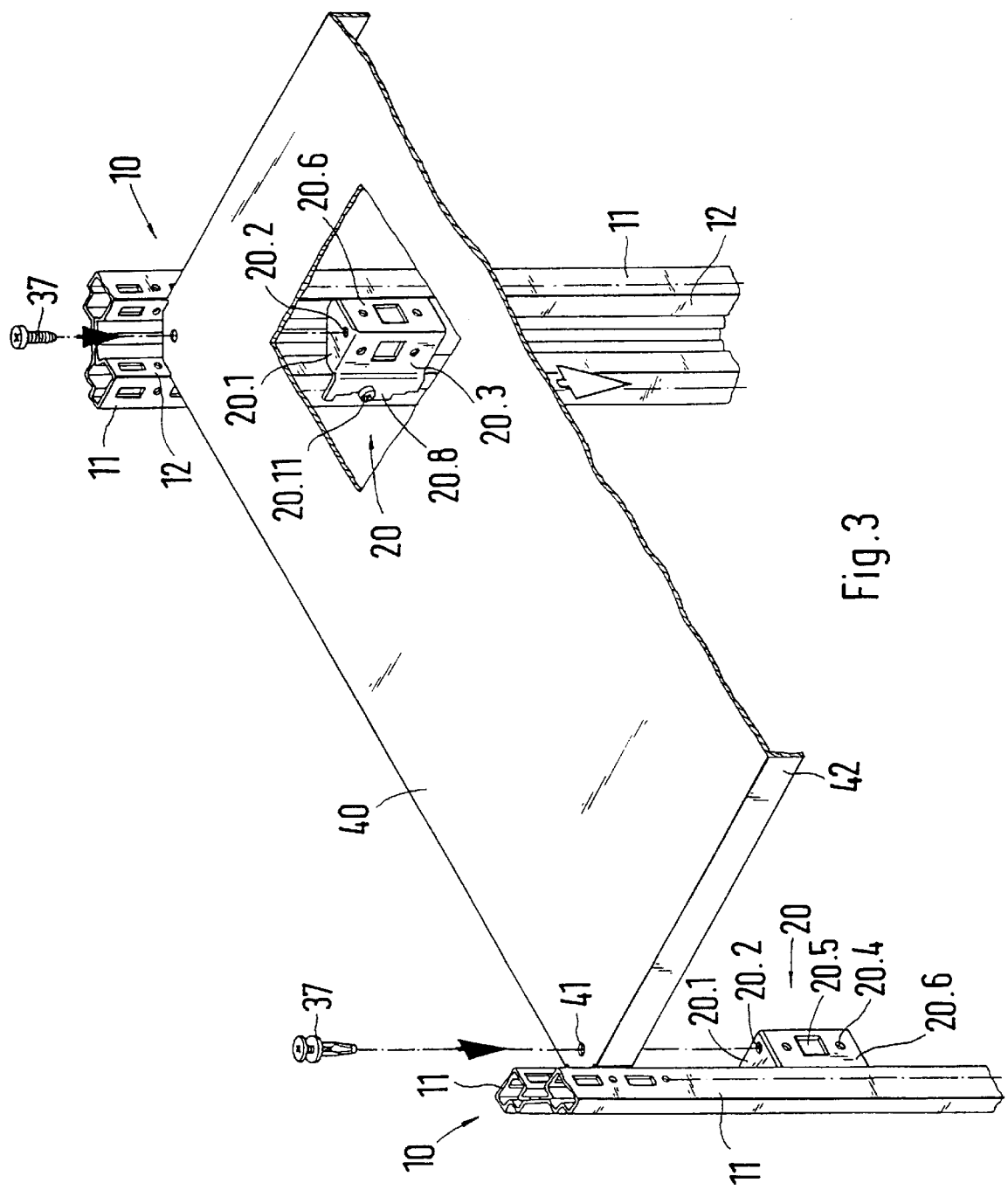
FIG. 3 is a partial perspective view of two vertical frame profiles of a rack, on each of which a fastening block for receiving a storage plate is fastened.

A further embodiment of the fastening block 20 is shown in FIG. 3. Two adjoining vertical frame profiles 10 of a rack are partially shown. A fastening block 20 is fixed in place on each one of the frame profiles 10. Here, each one of the fastening blocks 20 is maintained on the vertical frame profiles at the same height, so that the support surfaces 20.1 are also located on one level. Because of the predetermined fastening grid of the fastening receivers 14, the alignment of the support surfaces 20.1 in the vertical frame profiles 10 is possible in a simple manner. A storage plate 40 can be placed on the support surfaces 20.1. In its corner areas facing the frame profiles 10, the storage plate 40 has screw receivers 41. Fastening screws 37 can be inserted through the screw receivers 41 and fastened in the fastening receivers 20.2 of the support surfaces 20.1. Vertical strips 42 are beveled along the edges of the storage plate 40 for stiffening.

What is claimed is:

1. In a fastening device for attachment of at least one add-on element to a plurality of vertical frame profiles of a switchgear cabinet, wherein each of the vertical frame profiles has a row of a plurality of evenly distributed fastening retainers, and a fastening block has a plurality of fastening receivers for connecting the at least one add-on element, the improvement comprising:

the fastening block (20) being at least one of punched and bent from a sheet metal blank and formed as an extruded element;

at least one hook element (20.7, 20.9) projecting from the fastening block (20), and suspendable in an associated one of the fastening retainers (14) of the frame profile (10);

the fastening block (20) having two lateral walls (20.3, 20.6) extending at right angles with respect to each other and forming a common vertical inner edge facing an interior of the switchgear cabinet; and the lateral walls (20.3, 20.6) having the fastening receivers (20.4, 20.5), a plurality of horizontal support surfaces (20.1) bent away from the lateral walls (20.3, 20.6) and sealing the fastening block (20) on a top and a bottom, and each of the horizontal support surfaces (20.1) having a receiving retainer (20.2).

2. In the fastening device in accordance with claim 1, wherein the lateral walls (20.3, 20.6) are maintained on a same level in which a plurality of profiled sides (11) of the vertical frame profiles (10) extend vertically with respect to a plurality of sides of the associated switchgear cabinet.

3. In the fastening device in accordance with claim 2, wherein the fastening block (20) is maintained in an interior receiver of one of the vertical frame profiles (10) formed by two interior walls (12) extending at an angle with respect to each other and extending in a longitudinal direction of the vertical frame profiles (10), the interior walls (12) have the fastening retainers (13, 14), and the fastening block (20) is fixed in place in one of the fastening retainers (14) by the at least one hook element (20.7).

4. In the fastening device in accordance with claim 3, wherein the fastening block (20) is aligned on at least one of the profiled sides (11) and the interior walls (12) by a plurality of centering surfaces.

5. In the fastening device in accordance with claim 3, wherein adjoining one of the two lateral walls (20.3, 20.6) the fastening block (20) has a flange (20.8) supporting the at least one hook element (20.9), and the flange (20.8) has a screw receiver (20.10) into which a screw (20.11) is introduced and screwed into the fastening retainer (13) of the frame profile (10).

6. In the fastening device in accordance with claim 1, wherein the fastening block (20) is maintained in an interior receiver of one of the vertical frame profiles (10) formed by two interior walls (12) extending at an angle with respect to each other and extending in a longitudinal direction of the vertical frame profiles (10), the interior walls (12) have the fastening retainers (13, 14), and the fastening block (20) is fixed in place in one of the fastening retainers (14) by the at least one hook element (20.7).

7. In the fastening device in accordance with claim 6, wherein the fastening block (20) is aligned on at least one of a plurality of profiled sides (11) of the vertical frame profiles (10) and the interior walls (12) by a plurality of centering surfaces.

8. In a fastening device for attachment of at least one add-on element to a plurality of vertical frame profiles of a switchgear cabinet, wherein each of the vertical frame profiles has a row of a plurality of evenly distributed fastening retainers, and a fastening block has a plurality of fastening receivers for connecting the at least one add-on element, the improvement comprising:

the fastening block (20) being at least one of punched and bent from a sheet metal blank and formed as an extruded element;

at least one hook element (20.7, 20.9) projecting from the fastening block (20), and suspendable in an associated one of the fastening retainers (14) of the frame profile (10);

the fastening block (20) having two lateral walls (20.3, 20.6) extending at right angles with respect to each other and forming a common vertical inner edge facing an interior of the switchgear cabinet; and the lateral walls (20.3, 20.6) having the fastening receivers (20.4, 20.5), adjoining one of the two lateral walls (20.3, 20.6) the fastening block (20) having a flange (20.8) supporting the at least one hook element (20.9), and the flange (20.8) having a screw receiver (20.10) into which a screw (20.11) is introduced and screwed into the fastening retainer (13) of the frame profile (10).

\* \* \* \* \*